United States Patent
Axnix et al.

(10) Patent No.: US 10,013,279 B2
(45) Date of Patent: *Jul. 3, 2018

(54) PROCESSING INTERRUPT REQUESTS

(71) Applicant: International Business Machines Corporation, Armonk, NY (US)

(72) Inventors: Christine Axnix, Dettenhausen (DE); Ute Gaertner, Schoenaich (DE); Jakob C. Lang, Altdorf (DE); Angel Nunez Mencias, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 21 days.

This patent is subject to a terminal disclaimer.

(21) Appl. No.: 14/810,928

(22) Filed: Jul. 28, 2015

(65) Prior Publication Data

US 2017/0031709 A1   Feb. 2, 2017

(51) Int. Cl.
*G06F 9/48*   (2006.01)
*G06F 13/24*   (2006.01)

(52) U.S. Cl.
CPC .......... *G06F 9/4812* (2013.01); *G06F 9/4843* (2013.01); *G06F 13/24* (2013.01)

(58) Field of Classification Search
CPC .................................... G06F 9/4812–9/4825
USPC .................... 710/260–269; 712/244
See application file for complete search history.

(56) References Cited

U.S. PATENT DOCUMENTS

| | | | |
|---|---|---|---|
| 5,446,910 A * | 8/1995 | Kennedy | G06F 15/17 710/1 |
| 5,560,019 A * | 9/1996 | Narad | G06F 15/17 710/260 |
| 6,189,065 B1 | 2/2001 | Arndt et al. | |
| 7,657,683 B2 | 2/2010 | Sridhar et al. | |
| 7,694,055 B2 | 4/2010 | Orita et al. | |
| 7,953,915 B2 | 5/2011 | Ge et al. | |
| 7,962,771 B2 | 6/2011 | Song et al. | |
| 8,234,431 B2 | 7/2012 | Kruglick | |
| 8,423,750 B2 | 4/2013 | Hall et al. | |
| 8,762,615 B2 | 6/2014 | Easton et al. | |
| 2002/0029358 A1* | 3/2002 | Pawlowski | G06F 11/0772 714/39 |

(Continued)

OTHER PUBLICATIONS

GenerOS: An Asymmetric Operating System Kernel for Multi-core Systems Qingbo Yuan, Jianbo Zhao, Mingyu Chen, Ninghui Sun Published: 2010.*
U.S. Appl. No. 14/863,657 entitled "Processing Interrupt Requests" filed Sep. 24, 2015.
Appendix P "IBM Patents and Patent Applications Treated as Related" pp. 2 dated Sep. 24, 2015.

(Continued)

*Primary Examiner* — Emerson Puente
*Assistant Examiner* — Paul Mills
(74) *Attorney, Agent, or Firm* — Edward P. Li

(57) ABSTRACT

A method, a computer program product, and a computer system for processing interrupt requests in a computer system. The computer system disables, for a processor, an interrupt request for threads other than an interrupt request handling thread. The computer system configures the processor to route the interrupt request to the interrupt request handling thread. The computer system determines, by the interrupt request handling thread, whether one of the threads needs to process the interrupt request. The computer presents, by the interrupt request handling thread, the interrupt request to the one of the threads, in response to determining that the one of the threads needs to process the interrupt request.

10 Claims, 4 Drawing Sheets

(56) References Cited

U.S. PATENT DOCUMENTS

| | | | |
|---|---|---|---|
| 2003/0046464 A1* | 3/2003 | Murty | G06F 9/4843 710/260 |
| 2005/0033889 A1* | 2/2005 | Hass | H04L 69/321 710/260 |
| 2006/0085179 A1 | 4/2006 | Hack et al. | |
| 2007/0239917 A1* | 10/2007 | Orita | G06F 13/24 710/268 |
| 2008/0005615 A1* | 1/2008 | Brenden | G06F 11/0793 714/13 |
| 2008/0082789 A1* | 4/2008 | Kang | G06F 9/4812 712/205 |
| 2008/0091867 A1* | 4/2008 | Plondke | G06F 9/30123 710/261 |
| 2009/0217019 A1* | 8/2009 | Gross | G06F 9/3851 712/244 |
| 2014/0006668 A1 | 1/2014 | Chew | |

OTHER PUBLICATIONS

Damato, Joe; "Useful kernel and driver performance tweaks for your Linux server"; TimetoBleed; Jul. 28, 2009; Printed on: Jun. 23, 2015; pp. 1-8; <http://timetobleed.com/useful-kernel-and-driver-performance-tweaks-for-your-linux-server/>.

Edwards, Chris; "How interrupt handling is being offloaded from microcontrollers"; newelectronics; Mar. 8, 2011; © Copyright Findlay Media Ltd, 2015; Printed on: Jun. 23, 2015; pp. 1-8; <http://www.newelectronics.co.uk/electronics-technology/how-interrupt-handling-is-being-offloaded-from-microcontrollers/32002/>.

Gibeling et al.; "SMT Low Overhead Interrupt Handling and Zero Copy Networking with Click"; CS252 Project Proposal; Spring 2005; Printed on: Mar. 14, 2015; 1 page; <http://www.eecs.berkeley.edu/~culler/courses/cs252-505/projects/SMT%20Interrupts%20Proposal.htm>.

* cited by examiner

PROCESSING INTERRUPT REQUESTS

TECHNICAL FIELD OF THE INVENTION

The present invention relates in general to data processing systems, and in particular, to a method, system and computer program product for processing interrupt requests in a computer system with multiple processors supporting simultaneous multithreading.

BACKGROUND

Within computing systems, an interrupt can be considered a signal that receives the attention of a processor and that is usually generated when input/output (I/O) activity is required. For example, interrupts may be generated when a key on the keyboard is pressed or when the mouse or other pointing device is moved. Other types of interrupts are generated by network controllers, storage devices, video devices, and other kinds of hardware devices. Also core/thread specific interrupts like firmware only interrupts may be generated on computer systems.

Interrupt handling for floating interrupts, i.e. interrupts that are presented to multiple processors in a computer system but only need to be handled by one processor, or interrupts that require only firmware intervention but not intervention of the customer program, creates processing overhead and impacts the performance of single-threaded customer workload, because the processor has to exit the customer workload processing, perform a context switch to enter the interrupt handler, analyze the interrupt condition, only to find out that the condition has already been handled by another processor.

Operating systems can reduce the impact on workload of the processors of a multiprocessor system by processing interrupt requests by only enabling a subset of the processors for interrupt handling, but as long as there is more than one processor enabled for interrupts which only one processor needs to handle, there is overhead in the computer system.

In case of a single threaded program only a main thread is setup for a guest and can execute a customer program, whereas another, secondary, thread stays in host mode and is only allowed to handle some interrupts (like quiesce interrupts) which need to be executed by all threads, independent if they are running customer code or not. Therefore, all interrupts which are enabled via PSW masks (like I/O interrupts) and/or control registers will interrupt the main thread running the customer program.

For example, a guest I/O interrupt is sent to all cores and threads in the system. Depending on HW/FW interrupt controls, among other conditions, the interrupt is made pending or not.

If it is made pending, a firmware interrupt handler gets invoked on each enabled thread. It is the responsibility of the firmware interrupt handler to make sure that only one thread presents the interrupt to software. This is done by sending a sysop to reset the interrupt indication on all cores. The core which first has reset the interrupt indication provided by hardware, is the one which has to handle the interrupt and present it to the software, all other cores exit the firmware interrupt handler without doing anything else, but have wasted execution time.

SUMMARY

In one aspect, a method for processing interrupt requests in a computer system is provided. The method comprises disabling, for a processor, an interrupt request for threads other than an interrupt request handling thread. The method further comprises configuring the processor to route the interrupt request to the interrupt request handling thread. The method further comprises determining, by the interrupt request handling thread, whether one of the threads needs to process the interrupt request. The method further comprises presenting, by the interrupt request handling thread, the interrupt request to the one of the threads, in response to determining that the one of the threads needs to process the interrupt request.

In another aspect, a computer program product for processing interrupt requests in a computer system is provided. The computer program product comprises a computer readable storage medium having program code embodied therewith. The program code is executable to: disable, for a processor, an interrupt request for threads other than an interrupt request handling thread; configure the processor to route the interrupt request to the interrupt request handling thread; determine, by the interrupt request handling thread, whether one of the threads needs to process the interrupt request; and present, by the interrupt request handling thread, the interrupt request to the one of the threads, in response to determining that the one of the threads needs to process the interrupt request.

In yet another aspect, a computer system for processing interrupt requests in a computer system is provided. The computer system comprises one or more processors, one or more computer readable tangible storage devices, and program instructions stored on at least one of the one or more computer readable tangible storage devices for execution by at least one of the one or more processors. The program instructions are executable to disable, for a processor, an interrupt request for threads other than an interrupt request handling thread. The program instructions are executable to configure the processor to route the interrupt request to the interrupt request handling thread. The program instructions are executable to determine, by the interrupt request handling thread, whether one of the threads needs to process the interrupt request. The program instructions are executable to present, by the interrupt request handling thread, the interrupt request to the one of the threads, in response to determining that the one of the threads needs to process the interrupt request.

DETAILED DESCRIPTION

Figure 1:
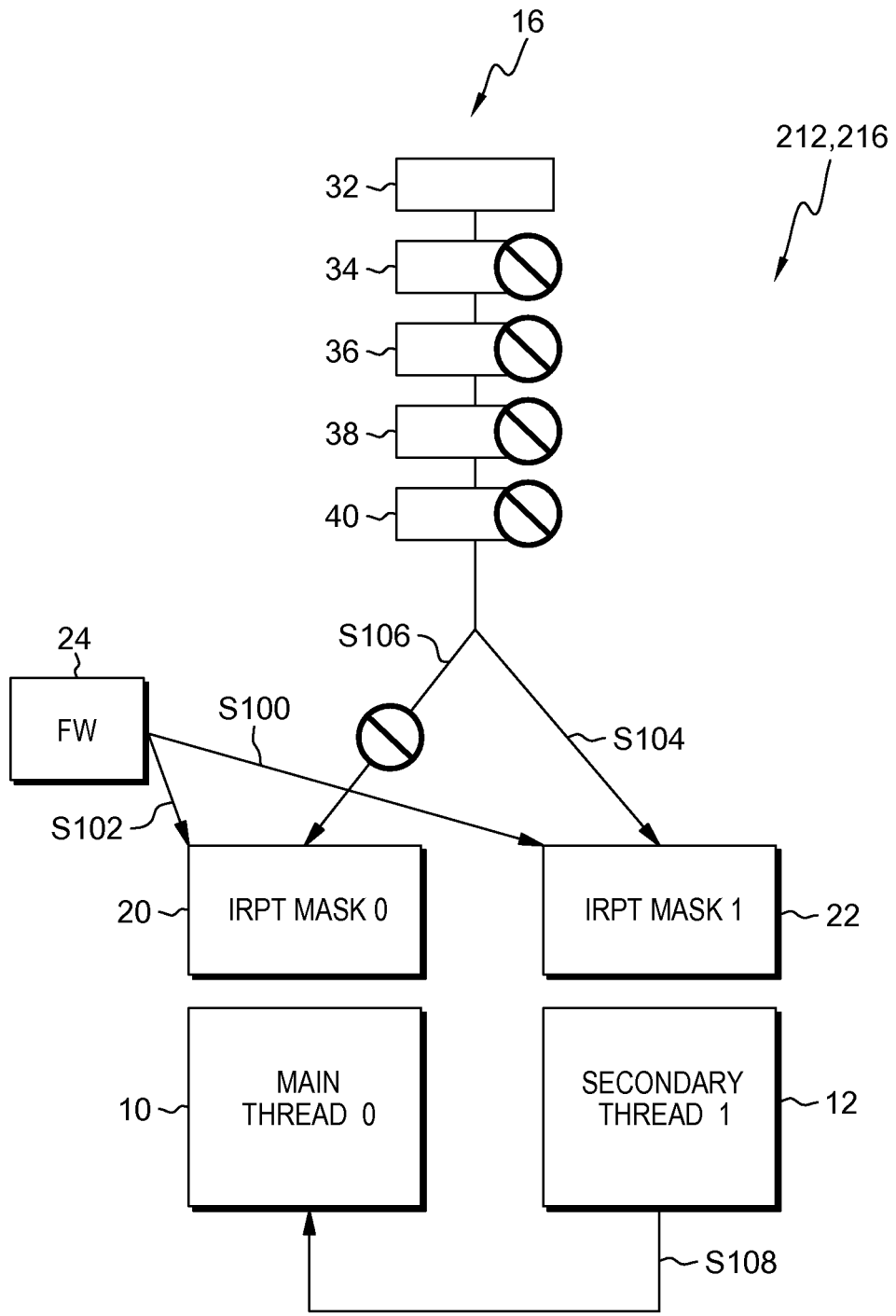
FIG. 1 is a system diagram for preprocessing of interrupt requests in a computer system with one or more processors supporting multithreading, in accordance with one embodiment of the present invention.

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

The illustrative embodiments described herein provide a method, system, and computer program product for processing interrupt requests in a computer system with one or more processors, supporting simultaneous multithreading. The illustrative embodiments are sometimes described herein using particular technologies only as an example for the clarity of the description. The illustrative embodiments may be used for processing interrupt requests, wherein for at least one of the processors a dedicated interrupt request handling thread is handling interrupt request processing only and is not used for workload processing of the computer system, and wherein the processors are configured to route interrupt requests determined for a particular thread to another thread.

The inventive method advantageously solves a problem which occurs in a one- or multi-processor environment, where hardware interrupt requests are presented to several processors and/or threads, but only one program executed by one thread of one of the processors needs to handle the interrupt request. All other threads will be interrupted to firmware level, just to find out they have nothing to do anymore as the interrupt request was already processed. For externally driven interrupts defining just one of the processors to handle the interrupt requests exclusively is prohibited for various reasons (redundancy, fast response time, . . . ) by the operating systems, as it would make this processor a special processor, expose it as a single point of failure and by doing so unevenly slowing down only one customer program on one of the processors. All these disadvantages may be overcome by the inventive method which is described in more detail in the illustrative embodiments explained in the Figures below. There are also core internal interrupts which cost performance like the polling of interrupts. The 'helper' thread can do the polling and check if the main thread 10 needs to get interrupted or not.

FIG. 1 depicts a system diagram for preprocessing of interrupt requests 16 in a computer system 212 with multiple processors 216 supporting multithreading, in accordance with one embodiment of the present invention. FIG. 1 shows only part of the computer system 212, namely, two threads 10 (main thread 0) and 12 (secondary thread 1) running on a processor 216 shown in FIG. 4, interrupt requests 16 presented in a data processing system 210 shown in FIG. 4, and firmware 24 of computer system 212. The computer system 212 is part of the data processing system 210 shown in FIG. 4.

Processing interrupt requests 16 in the computer system 212 with multiple processors 216, where the processors 216 are enabled for interrupt request processing, and each of the processors 216 supports simultaneous multithreading, is described. According to an embodiment of the inventive method for each of the processors 216 an interrupt request handling thread 12, which is not used by software for workload processing of the computer system 212, is handling interrupt request processing. One or more processors 216 are configured, each processor 216 separately, to route interrupt requests 16 determined for a particular thread 10 to another thread 12. According to the inventive method disabling, for each of the processors 216, interrupt requests 16 for threads 10 other than the respective interrupt request handling thread 12 are disabled and the respective processor 216 is configured to route interrupt requests 16 to the respective interrupt request handling thread 12. Further the interrupt request handling thread 12 determines, in response to an interrupt request 16, whether one of the other threads 10 of the respective processor 216 needs to process the interrupt request 16. The interrupt request handling thread 12 presents the interrupt request 16 to the respective thread 10, in case it determines that another thread 10 needs to process the interrupt request 16.

At least one thread 10 other than the interrupt request handling thread 12 may be used on the same processor 216. The means to route interrupt requests 16 determined for a particular thread 10 to another thread 12 may comprise hardware/firmware interrupt request masks 20 (IRPT mask 0) and 22 (IRPT mask 1). Thus, in FIG. 1, an interrupt mask 20 is set up on the main thread 10 by the firmware 24, step S102, and an interrupt mask 22 is set up on the second interrupt request handling thread 12 by the firmware 24, step S100.

Interrupt requests 16 are presented on the processor 216 running the two threads 10 and 12. All threads 10 and 12 of the processor 216 are accessing the interrupt request 16 simultaneously in steps S104 and S106, but most of the interrupts 34, 36, 38, and 40 are routed in step S104 to the second thread 12, because the interrupt mask 20 of the main thread 10 is configured respectively. Interrupt requests 16, 32 not being routed to the interrupt request handling thread 12 comprise, for example, a recovery event, a cache/TLB event, and a scheduler interrupt. The interrupt requests 34, 36, 38, and 40, routed to the second thread 12, are handled on this thread 12. If the thread 12 decides that the main thread 10 needs to be interrupted, it will create an interrupt request to the main thread 10 in step S108.

To avoid the unnecessary interruption of the main thread 10 which is executing the customer program, during setup of thread 10, which is done by firmware, firmware overwrites the HW/FW interrupt mask bits to disable interrupts on the main thread 10. The customer program and zone mask controls are kept untouched, but disabled via HW/FW internal controls. Thread interrupt request routing mechanisms are set up in the HW such that these interrupts are routed to the secondary/unused thread 12. The secondary thread's 12 customer mode interrupt masks/controls are enabled like on the main thread 10, and the HW is setup such that the firmware interrupt handler routine gets invoked on the secondary thread 12, and not on the main thread 10, when an interrupt request 16 comes in.

In case an interrupt condition occurs in the HW, the HW decides based on the interrupt mask setup on which thread the firmware interrupt handler gets invoked. For 'offloaded' interrupt requests, the secondary thread 12 gets the firmware interrupt request, the main thread 10 is not interrupted at this point. The firmware interrupt handler does all necessary pretesting of the interrupt condition. For example, rules or algorithms may be specified in the interrupt handler for each interrupt category (e.g. timer interrupts, I/O interrupts, machine check interrupts, and other externally triggered conditions) to determine if an interrupt request is an over-initiative, can be handled by the secondary thread 12 itself, or really requires involvement of the main thread 10. If needed, the interrupt handler running on the secondary thread 12 can access the main thread's 10 interrupt controls and state information, such as processor status word (PSW), other registers, and data, to make this decision, since it is running on the same core and has access to all of the main thread's 10 state.

If the firmware interrupt handler running on the secondary thread 12 decides that the interrupt handler needs to be taken on the main thread 10, for example to present it to software, there are two options. (1) The secondary thread 12 re-enables the HW/FW interrupt mask 20 on the main thread 10. This option can be used if the interrupt condition still exists in the HW and has not been reset yet. The firmware interrupt handler on the main thread immediately gets the interrupt request 16 and can process it. (2) If the original interrupt condition in the HW has been reset already, the secondary thread 12 sends a firmware interrupt to the main thread 10, as well as additional information. Details of the interrupt request 16 or results of the interrupt request pre-analysis performed by the secondary thread 12, may be provided. The firmware interrupt handler in the main thread 10 evaluates pending interruptions in the HW and the additional information, and presents the interrupt request to the main thread's 10 customer program as required.

An example is a computer system running with 20 CPUs, executing single-threaded, i.e. only thread 10 executing customer code. Assuming that ten of these CPUs are enabled for I/O interrupts via a processor status word (PSW) and zone mask tables. An I/O interrupt pending in the hardware causes the firmware I/O interrupt handlers getting invoked on all ten CPUs, but now on thread 12, without interrupting the running customer code in thread 10. Only one of these ten CPUs presents the interrupt to the operating system. The other CPUs exit the firmware interrupt handler as soon as they see that another CPU will present the interrupt. Thus, the CPUs have not wasted customer execution time. Only on the CPU presenting the interrupt request to the operating system, the secondary thread 12 invokes the main thread 10 using one of the options described before. In order to achieve this, firmware may be overwriting hardware/firmware interrupt request mask bits of all threads 10 other than the interrupt request handling thread 12. Internal interrupt processing is also possible by generating interrupt requests by reading a cache line by the firmware and checking for a processor relevant bit having been changed.

Figure 2:
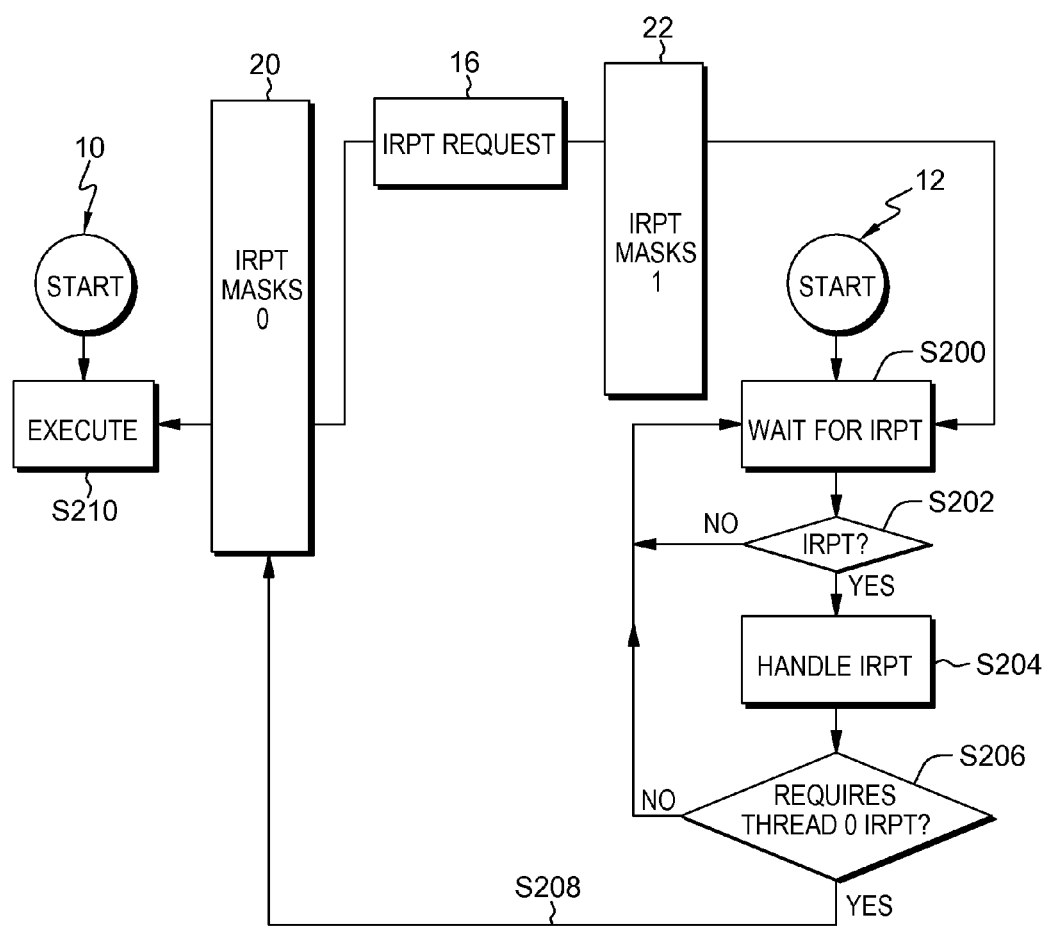
FIG. 2 is a flowchart of the preprocessing of interrupt requests with enabling an interrupt request mask of the main thread, in accordance with one embodiment of the present invention.

FIG. 2 shows a flowchart of the preprocessing of interrupt requests 16 with enabling the interrupt request mask 20 of the main thread 10, in accordance with one embodiment of the present invention. The interrupt request handling thread 12 may enable the interrupt request mask 20 of the respective thread 10, in case the interrupt request handling thread 12 determines that another thread 10 needs to process the interrupt request 16 and the interrupt request 16 still exists in the hardware. The interrupt request 16 may be then handled on the respective thread 10 by a firmware interrupt request handler.

The interrupt request 16 is presented to both threads 10 and 12 at the same time, but the interrupt request mask 20 of the main thread 10 blocks the interrupt request 16. The main thread 10 still keeps executing, at step S210. The interrupt request handling thread 12 waits for an interrupt request 16, at step S200. A loop checks for an incoming interrupt request 16, at step S202. If there is an interrupt request 16, the interrupt request 16 is handled in step S204. At step S206, it is checked whether the interrupt request 16 requires to be processed by the main thread 10. If 'yes', the interrupt request mask 20 of the main thread 10 is enabled at step S208.

Figure 3:
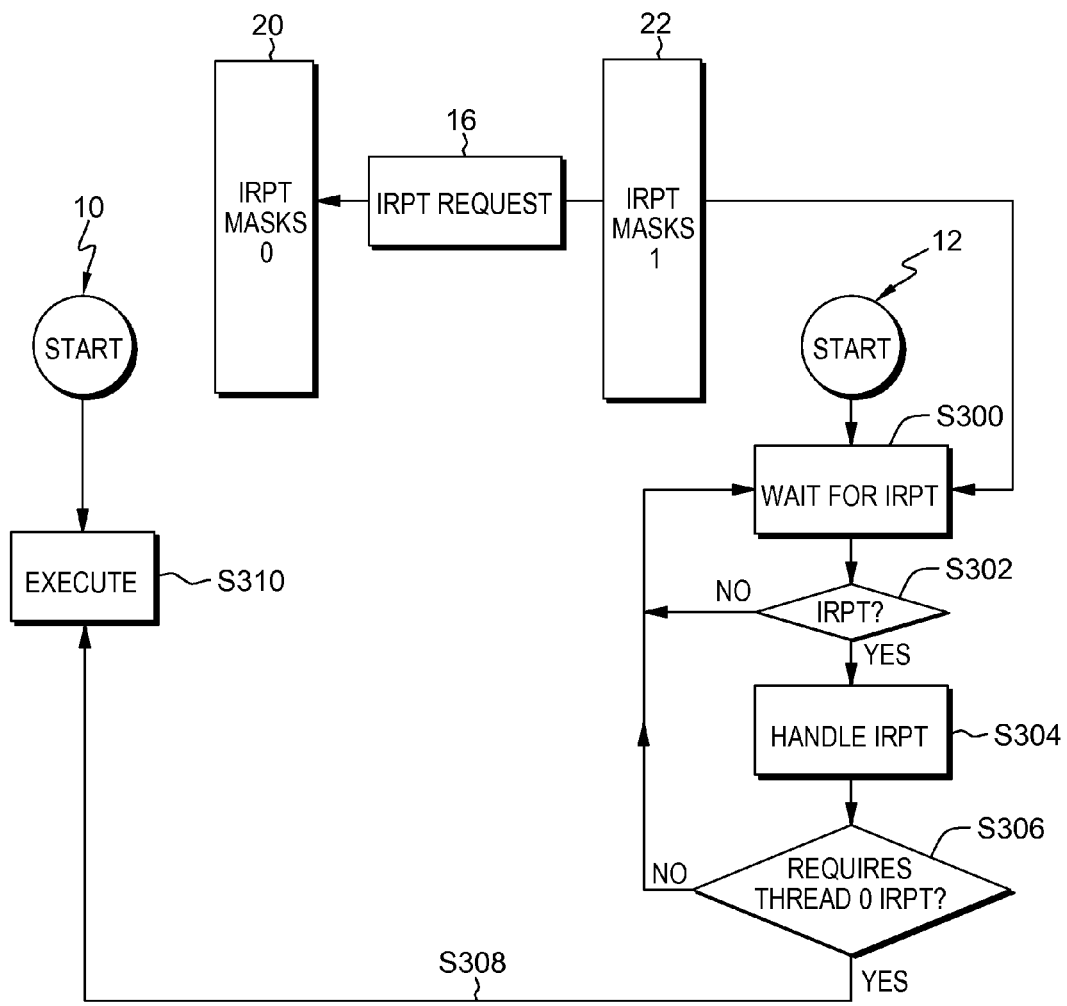
FIG. 3 is a flowchart of the preprocessing of interrupt requests with notifying the main thread via a firmware interrupt, in accordance with one embodiment of the present invention.

FIG. 3 depicts a flowchart of the preprocessing of interrupt requests 16 with notifying the main thread 10 via a firmware interrupt, in accordance with one embodiment of the present invention. An interrupt request 16 is presented to both threads 10 and 12 in the same way as in the embodiment shown in FIG. 2. The interrupt request mask 20 of the main thread 10 blocks the interrupt request 16. The interrupt request handling thread 12 waits for an interrupt request 16 at steps S300 and S302. If there is an interrupt request 16 being presented, it is handled at step S304 and checked if it requires the thread 10 to be involved. If 'yes', the respective thread 10 is notified at step S308 by the interrupt request handling thread 12 via a firmware interrupt and/or information about an interrupt request pre-analysis in case the interrupt request handling thread 12 determines that another thread 10 needs to process the interrupt request 16. The firmware interrupt request handler of the respective thread 10 then evaluates pending interrupt requests 16 in the hardware and/or information about the interrupt request pre-analysis and presents the interrupt request 16 to a customer program running in the respective thread 10.

Figure 4:
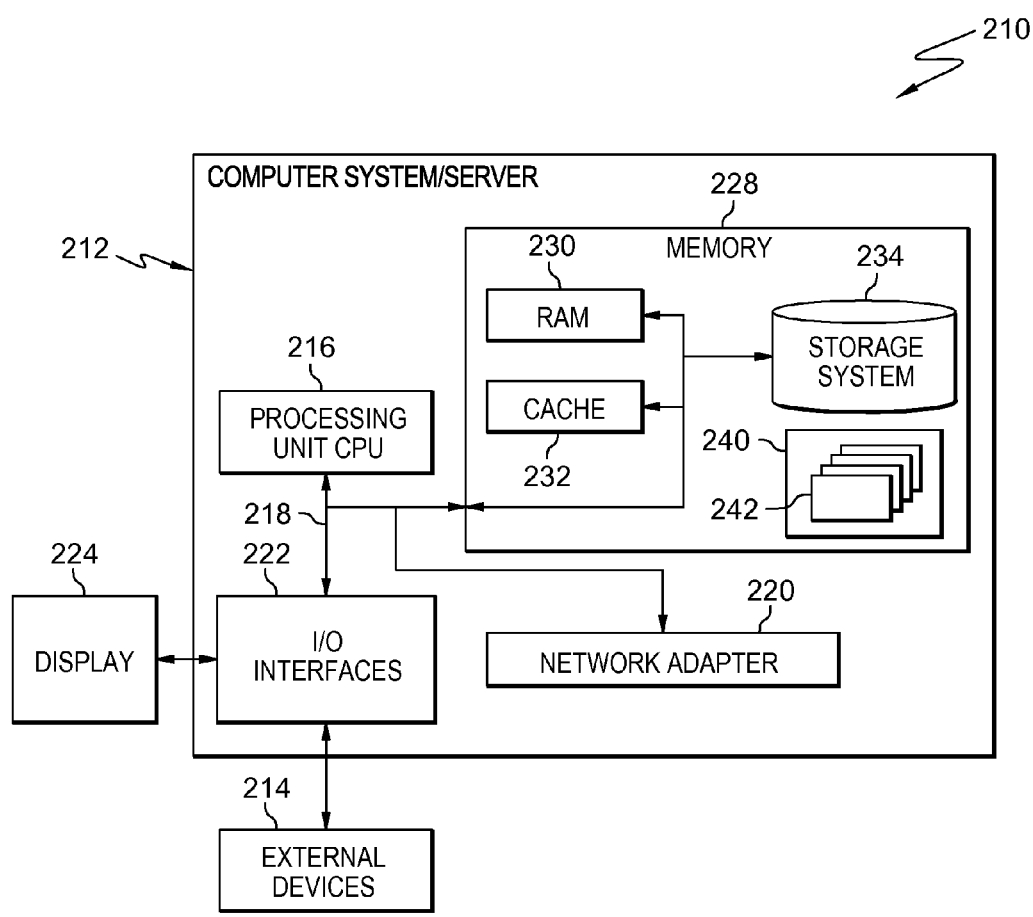
FIG. 4 shows a data processing system for executing a method, in accordance with one embodiment of the present invention.

FIG. 4 shows a schematic of an example of a data processing system 210. Data processing system 210 is only one example of a suitable data processing system and is not intended to suggest any limitation as to the scope of use or functionality of embodiments of the invention described herein. Regardless, data processing system 210 is capable of being implemented and/or performing any of the functionality set forth herein above.

Data processing system 210 includes a computer system/server 212, which is operational with numerous other general purpose or special purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

In FIG. 4, computer system/server 212 in data processing system 210 is shown in the form of a general-purpose computing device. The components of computer system/server 212 may include, but are not limited to, one or more processors or processing units CPU 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown in FIG. 4, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that, although not shown, other hardware and/or software components could be used in conjunction with computer system/server 212. Examples include, but are not limited to, microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, and conventional procedural programming languages, such as the "C" programming language, or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the FIGs illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGs. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for processing interrupt requests in a computer system comprising at least one processor which supports simultaneous multithreading for a plurality of threads comprising at least a first thread and an interrupt request handling thread, the computer program product comprising a computer readable storage medium having program code embodied therewith, the program code executable to:
disable, by firmware of the computer system, an interrupt request mask of the first thread and enable an interrupt request mask of the interrupt request handling thread;
route, by the processor, in response to an interrupt condition occurring in hardware, a first interrupt request to the interrupt request handling thread, wherein the disabled interrupt request mask of the first thread prevents the first interrupt request from being routed to the first thread;
pretest, by the interrupt request handling thread, the first interrupt request, wherein the program code executable to pretest the first interrupt request comprises program code executable to collect information about the first interrupt request and determine whether the first thread needs to process the first interrupt request; and
present, by the interrupt request handling thread, the first interrupt request to the first thread in response to determining that the first thread needs to process the first interrupt request, wherein the program code executable to present the first interrupt request comprises program code executable to:
determine whether the interrupt condition in hardware has been reset;
in response to determining that the interrupt condition in hardware has not been reset, re-enable the interrupt request mask of the first thread causing the first interrupt request to also be routed to the first thread; and
in response to determining that the interrupt condition in hardware has been reset, send a firmware interrupt and the collected information about the first interrupt request to the first thread.

2. The computer program product of claim 1, further comprising the program code executable to:
handle, by a firmware interrupt request handler on the first thread, the first interrupt request in response to the first interrupt request being routed to the first thread when the interrupt request mask of the first thread was re-enabled, wherein the program code executable to handle the first interrupt request comprises program code executable to present the first interrupt request to a program being run by the first thread.

3. The computer program product of claim 1, further comprising the program code executable to;
evaluate, by a firmware interrupt request handler on the first thread, the collected information about the first interrupt request in response to receiving the firmware interrupt; and
present, by the firmware interrupt request handler on the first thread, the first interrupt request to a program being run by the first thread based on the evaluating.

4. The computer program product of claim 1, wherein the program code executable to disable the interrupt request mask of the first thread and enable the interrupt request mask of the interrupt request handling thread corn irises program code executable to overwrite, by the firmware, hardware/firmware interrupt request mask bits of the plurality threads.

5. The computer program product of claim 1, further comprising the program code executable to:
read a cache line, by the firmware, and check for a processor relevant bit having been changed to generate interrupt requests.

6. A computer system for processing interrupt requests in a computer system, the computer system comprising:
at least one processor which supports simultaneous multithreading for a plurality of threads comprising at least a first thread and an interrupt request handling thread, one or more computer readable tangible storage devices, and program code stored on at least one of the one or more computer readable tangible storage devices for execution by the processor, the program code executable to:
disable, by firmware of the computer system, an interrupt request mask of the first thread and enable an interrupt request mask of the interrupt request handling thread;
route, by the processor, in response to an interrupt condition occurring in hardware, a first interrupt request to the interrupt request handling thread, wherein the disabled interrupt request mask of the first thread prevents the first interrupt request from being routed to the first thread;

pretest, by the interrupt request handling thread, the first interrupt request, wherein the program code executable to pretest the first interrupt request comprises program code executable, to collect information about the first interrupt request and determine whether the first thread needs to process the first interrupt request; and present, by the interrupt request handling thread, the first interrupt request to the first thread in response to determining that the first thread needs to process the first interrupt request, wherein the program code executable to present the first interrupt request comprises program code executable to:

determine whether the interrupt condition in hardware has been reset;

in response to determining that the interrupt condition in hardware has not been reset, re-enable the interrupt request mask of the first thread causing the first interrupt request to also be routed to the first thread; and in response to determining that the interrupt condition in hardware has been reset, send a firmware interrupt and the collected information about the first interrupt request to the first thread.

7. The computer system of claim 6, wherein the program code further comprises program code executable to:

handle, by a firmware interrupt request handler on the first thread, the first interrupt request in response to the first interrupt request being routed to the first thread when the interrupt request mask of the first thread was re-enabled, wherein the program code executable to handle the first interrupt request comprises program code executable to present the first interrupt request to a program being run by the first thread.

8. The computer system of claim 6, wherein the program code further comprises program code executable to:

evaluate, by a firmware interrupt request handler on the first thread, the collected information about the first interrupt request in response to receiving the firmware interrupt; and present, by the firmware interrupt request handler on the first thread, the first interrupt request to a program being run by the first thread based on the evaluating.

9. The computer system of claim 6, wherein the program code executable to disable the interrupt request mask of the first thread and enable the interrupt request mask of the interrupt request handling thread comprises program code executable to overwrite, by the firmware, hardware/firmware interrupt request mask bits of the plurality threads.

10. The computer system of claim 6, wherein the program code further comprises program code executable to:

read a cache line, by the firmware, and check for a processor relevant bit having been changed to generate interrupt requests.

* * * * *